(12) United States Patent
Martin et al.

(10) Patent No.: US 11,642,950 B2
(45) Date of Patent: May 9, 2023

(54) TRANSMISSION FOR AN ELECTRIC DRIVE OR DRIVE TRAIN OF A VEHICLE, ELECTRIC DRIVE AND DRIVE TRAIN

(71) Applicant: ZF Friedrichshafen AG, Friedrichshafen (DE)

(72) Inventors: Thomas Martin, Weissensberg (DE); Michael Wechs, Weißensberg (DE); Fabian Kutter, Kressbronn (DE); Oliver Schaudt, Cologne (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 17/464,243

(22) Filed: Sep. 1, 2021

(65) Prior Publication Data
US 2022/0065334 A1    Mar. 3, 2022

(30) Foreign Application Priority Data

Sep. 2, 2020 (DE) ...................... 10 2020 211 070.0

(51) Int. Cl.
*B60K 1/00* (2006.01)
(52) U.S. Cl.
CPC .......... *B60K 1/00* (2013.01); *B60K 2001/001* (2013.01); *B60Y 2400/73* (2013.01)
(58) Field of Classification Search
CPC ................ B60K 2001/001; B60K 1/00; B60Y 2400/73; H02K 7/116
See application file for complete search history.

(56) References Cited

U.S. PATENT DOCUMENTS 9,707,834 B2 * 7/2017 Lee ........................... F16H 3/62
10,406,908 B2 * 9/2019 Brehmer ................. F16H 3/724
11,065,956 B2 * 7/2021 Lutz ..................... F16H 61/0059

FOREIGN PATENT DOCUMENTS

CN 108240432 A 7/2018
DE 102015225171 A1 6/2017

* cited by examiner

*Primary Examiner* — Erin D Bishop
(74) *Attorney, Agent, or Firm* — Dority & Manning, P.A.

(57) ABSTRACT

A transmission (1) for an electric drive of a vehicle includes a first input shaft (10), a second input shaft (11), an output shaft (12), two shift elements (3, 4) for connecting the transmission (1) to an electric machine of the electric drive, and a planetary gear set (5) configured as a stepped planetary gear set. A first sun gear (5.1) of the planetary gear set (5) is rotationally fixed to the first input shaft (10). A second sun gear (5.2) of the planetary gear set (5) is rotationally fixed to the second input shaft (11). A ring gear (5.5) of the planetary gear set (5) is fixed at a rotationally fixed component (0) of the transmission (1). A planet carrier (5.6) of the planetary gear set (5) is rotationally fixed to the output shaft (12). A first shift element (3) is configured for connecting the first input shaft (10) to the electric machine of the electric drive. A second shift element (4) is configured for connecting the second input shaft (11) to the electric machine of the electric drive.

20 Claims, 18 Drawing Sheets

| Gear | Engaged Shift Elements | | phi |
|---|---|---|---|
| | 3 | 4 | |
| E1 | X | | 2.00 |
| E2 | | X | |

Fig. 5

| Gear | Engaged Shift Elements | | | phi |
|---|---|---|---|---|
| | 3 | 4 | 6 | |
| E1 | X | | | 2.00 |
| E2 | | X | | 2.00 |
| E3 | | | X | |

Fig. 9

| Gear | Engaged Shift Elements | | | phi |
|---|---|---|---|---|
| | 3 | 4 | 7 | |
| E1 | X | | X | 2.00 |
| E2 | | X | X | 2.00 |
| E3 | X | X | | |

Fig. 12

| Gear | Engaged Shift Elements | | |
|---|---|---|---|
| | 3 | 4 | phi |
| E1 | X | | 2.00 |
| E2 | | X | |

Fig. 18

TRANSMISSION FOR AN ELECTRIC DRIVE OR DRIVE TRAIN OF A VEHICLE, ELECTRIC DRIVE AND DRIVE TRAIN

CROSS-REFERENCE TO RELATED APPLICATION

The present application is related and has right of priority to German Patent Application No. 102020211070.0 filed in the German Patent Office on Sep. 2, 2020, which is incorporated by reference in its entirety for all purposes.

FIELD OF THE INVENTION

The invention relates generally to an electric drive for a drive train, and to a drive train.

BACKGROUND

CN 108240432 A describes a vehicle drive with a planetary gear set designed as a stepped planetary gear set, wherein the drive motor can be optionally connected to the first sun gear or to the second sun gear via two clutches. The drive output takes place via the shared planet carrier of the two planetary gear sets. A ring gear is fixedly connected to the transmission housing. The document describes a 2-speed variant and a 3-speed variant, wherein the motor can be connected to the carrier via a third clutch.

DE 10 2015 225 171 A1 describes a transmission arrangement for a vehicle, including a dual clutch, which can optionally connect a motor shaft to a first sun gear or to a second sun gear. The particular planetary gears are connected to each other as double planetary gears. The drive output takes place via the carrier, which is connected to the sun gear of a further planetary gear set. The drive output takes place, once again, via the carrier and forms the input of a differential.

SUMMARY OF THE INVENTION

Example aspects of the present invention provide an alternative electric drive.

According to example aspects of the invention, an electric drive is provided. The electric drive includes an electric machine and a transmission. The transmission includes a first input shaft, a second input shaft, an output shaft, and at least two shift elements for connecting the transmission to the electric machine. Moreover, the transmission includes a planetary gear set.

The planetary gear set is designed as a stepped planetary gear set, the planetary gears of which, mounted at a planet carrier, have two different sized effective diameters. A first sun gear of the planetary gear set is in mesh with the larger effective diameter of the planetary gears. A second sun gear of the planetary gear set is in mesh with the smaller effective diameter of the planetary gears. A ring gear of the planetary gear set is in mesh with the larger effective diameter of the planetary gears. The first sun gear of the planetary gear set is rotationally fixed to the first input shaft. The second sun gear of the planetary gear set is rotationally fixed to the second input shaft. The ring gear of the planetary gear set is fixed at a rotationally fixed component of the electric drive. The planet carrier of the planetary gear set is rotationally fixed to the output shaft. A first shift element is designed for connecting the first input shaft to the electric machine of the electric drive. A second shift element is designed for connecting the second input shaft to the electric machine of the electric drive.

A particular rotationally fixed connection of the rotatable components of the electric drive and/or of the transmission is preferably implemented, according to example aspects of the invention, via one or also multiple intermediate shaft(s), which can also be present as short intermediate pieces when the components are positioned in a spatially dense manner. Specifically, the components that are permanently rotationally fixed to each other can each be present either as individual components that are rotationally fixed to each other, or also as single pieces. In the second case mentioned above, the particular components and the optionally present shaft are then formed by one shared component, wherein this is implemented, in particular, when the particular components are situated spatially close to each other in the transmission.

In the case of components of the electric drive and/or of the transmission that are rotationally fixed to each other only upon actuation of a particular shift element, a connection is also preferably implemented via one or also multiple intermediate shaft(s). A fixation takes place, in particular, by way of a rotationally fixed connection to a rotationally fixed component of the electric drive, which is preferably a permanently non-rotating component, preferably a housing of the transmission, a part of such a housing, or a component rotationally fixed thereto. Within the meaning of the invention, the connection of the rotor of the electric machine to the first input shaft or the second input shaft of the transmission is to be understood as a connection of such a type that a constant rotational-speed dependence prevails between the rotor of the electric machine and the corresponding input shaft.

The individual shift elements can each be present as a force-locking shift element and as a form-locking shift element. Force-locking or friction-locking shift elements are, for example, lamellar shift elements, in particular in the form of multi-disk clutches. Form-locking shift elements are, for example, constant-mesh shift elements and conical shift elements in the form of dog clutches and cone clutches, respectively. The first shift element can be arranged, in particular, axially between the second shift element and the first sun gear.

The electric drive allows for a drive output that is axially parallel or also coaxial to the input shafts. The electric drive can therefore be utilized, in particular, for a front-transverse drive train of a vehicle.

The first input shaft can be arranged coaxially to the second input shaft. If, in the case of a coaxial arrangement of the input shafts, the first input shaft is designed to be hollow, it is preferred for an axially compact transmission and/or electric drive that the second input shaft is arranged within the first input shaft, which is designed to be hollow. The output shaft can be arranged coaxially to the first input shaft and the second input shaft.

The electric drive allows for the shifting of two gears. In this way, in particular, a first gear can be formed by engaging the first shift element and a second gear can be formed by engaging the second shift element. Thus, in the first gear, the first shift element is engaged, whereas the second shift element is disengaged. The converse applies in the second gear.

In the first gear, a ratio of i>1 preferably arises. Particularly preferably, the ratio in the first gear is i=4. In the second gear, a ratio of i>1 preferably arises. Particularly preferably, the ratio in the second gear is i=2. Therefore, a gear step of essentially 2.0 is preferably achieved between these two gears. The efficiencies of this preferred connection are very high. In the first gear, an efficiency of 98.5% can be achieved. In the second gear, an efficiency of 99% can be achieved.

If the second shift element is designed, for example, as a multi-disk clutch, a traction powershift from the first gear into the second gear is possible. A traction powershift from the second gear into the first gear is also possible.

The first shift element is preferably designed as a constant-mesh shift element, in order to allow for a transmission that is optimized with respect to cost and efficiency. The stepped planetary gear set is particularly advantageous in this transmission, since a ring gear can be completely dispensed with.

By simultaneously engaging the first shift element and the second shift element, the planetary gear set and, thereby, the drive output is interlocked against the housing or in relation to the housing. This represents the function of a parking lock, which can thereby be saved as a separate component/assembly. If a planetary gear set is interlocked, the ratio is always one regardless of the number of teeth. In other words, the planetary gear set revolves as a block.

In a further example embodiment of the invention, it is preferred that a third shift element is provided for connecting the output shaft to the electric machine of the electric drive. The third shift element, in the engaged condition, makes a third gear possible. In this third gear, the first shift element and the second shift element are disengaged.

Due to the coupling of the drive output to the input, a direct gear having a ratio of i=1 is brought about. Therefore, a preferred gear step of essentially 2.0 results here as well. The efficiencies of this preferred connection are very high. In the first gear, an efficiency of 98.5% can be achieved. In the second gear, an efficiency of 99% can be achieved. In the third gear, an efficiency of 100% can be achieved.

In an example modification of the invention, it is preferred that the ring gear is not permanently fixed at the housing, but rather is fixable at the rotationally fixed component by a fourth shift element.

In this example modification, it is preferred that a first gear results by engaging the first shift element and the fourth shift element; and/or a second gear results by engaging the second shift element and the fourth shift element; and/or a third gear results by engaging the first shift element and the second shift element. In this example embodiment, the third shift element for producing the direct gear is dispensed with. The direct gear is now obtained by simultaneously engaging the first and second shift elements when the fourth shift element is disengaged. In each of the three gears, two of the three shift elements are engaged, which, in comparison to the above-described 3-speed variant, brings about considerably lower drag losses.

Force-locking shift elements as well as form-locking shift elements can also be utilized in the two above-described 3-speed variants.

It is preferred that the first, second, and fourth shift elements are each designed as a friction or force-locking shift element, since, as a result, the three gears are completely power shiftable.

Alternatively, it is preferred that the first and second shift elements are each designed as a friction or force-locking shift element and the fourth shift element is designed as a form-locking shift element. This ensures that the gear shift from the first gear into the second gear and back is power shiftable in traction and overrun. The gear shift from the second gear into the third gear is power shiftable in the traction operation. In the upper speed range with a low electrical tractive force, however, this is secondary with respect to comfort and performance. In the direct gear, negligible drag losses arise due to the disengaged constant-mesh shift element, in contrast to the disengaged fourth powershift element of the above-described example embodiment.

According to a second example aspect of the invention, a drive train for a vehicle is made available, the drive train encompassing the above-described electric drive and a differential device, which is connected to the output shaft of the first planetary gear set.

A drive train is preferred when the differential device includes a bevel gear differential and a transmission gearing, wherein the transmission gearing is formed by a spur gear stage or by a planetary gear set. A drive train of this type yields an axially parallel drive output and is axially particularly compact.

A drive train is preferred when the differential device includes a second planetary gear set and a third planetary gear set. A drive train of this type is also axially compact, wherein this drive train preferably has a coaxial drive output.

A drive train is preferred when the differential device includes a bevel gear differential and a transmission gearing, wherein the transmission gearing is formed by a planetary gear set and the bevel gear differential is arranged radially within a rotor of the electric machine. This drive train is also axially particularly compact.

BRIEF DESCRIPTION OF THE DRAWINGS

Advantageous example embodiments of the invention, which are explained in the following, are represented in the drawings, in which:

FIG. 5 shows a gear shift matrix of the transmission from FIG. 4;

FIG. 9 shows a gear shift matrix of the transmission from FIGS. 6 through 8;

FIG. 12 shows a gear shift matrix of the transmission from FIGS. 10 and 11;

FIG. 18 shows a gear shift matrix of the transmission of the drive train from FIGS. 13 through 17.

DETAILED DESCRIPTION

Figure 1:
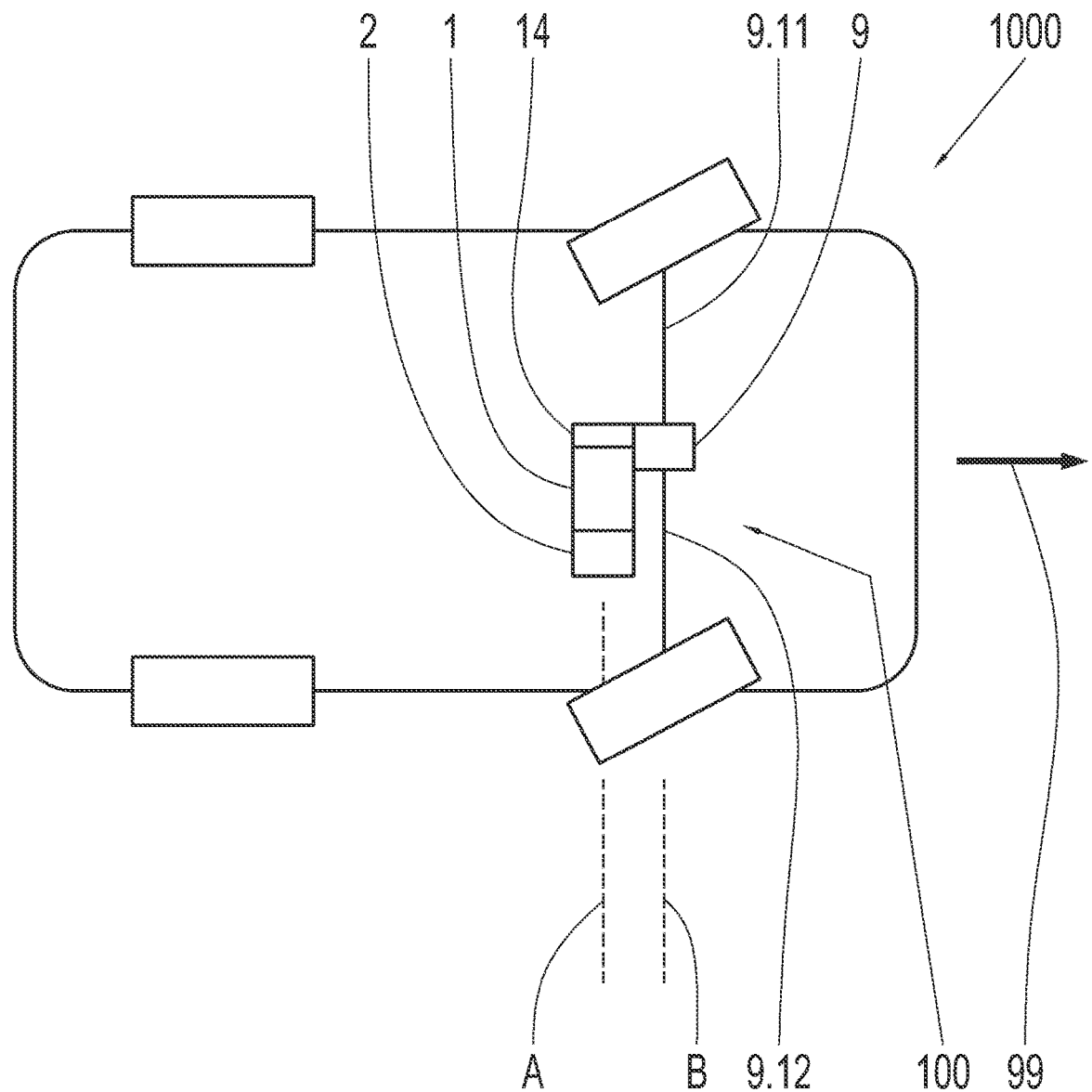
FIGS. 1-3 each show a diagrammatic view of a drive train of a vehicle, in which the transmission according to the invention is utilized.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

Figure 2:
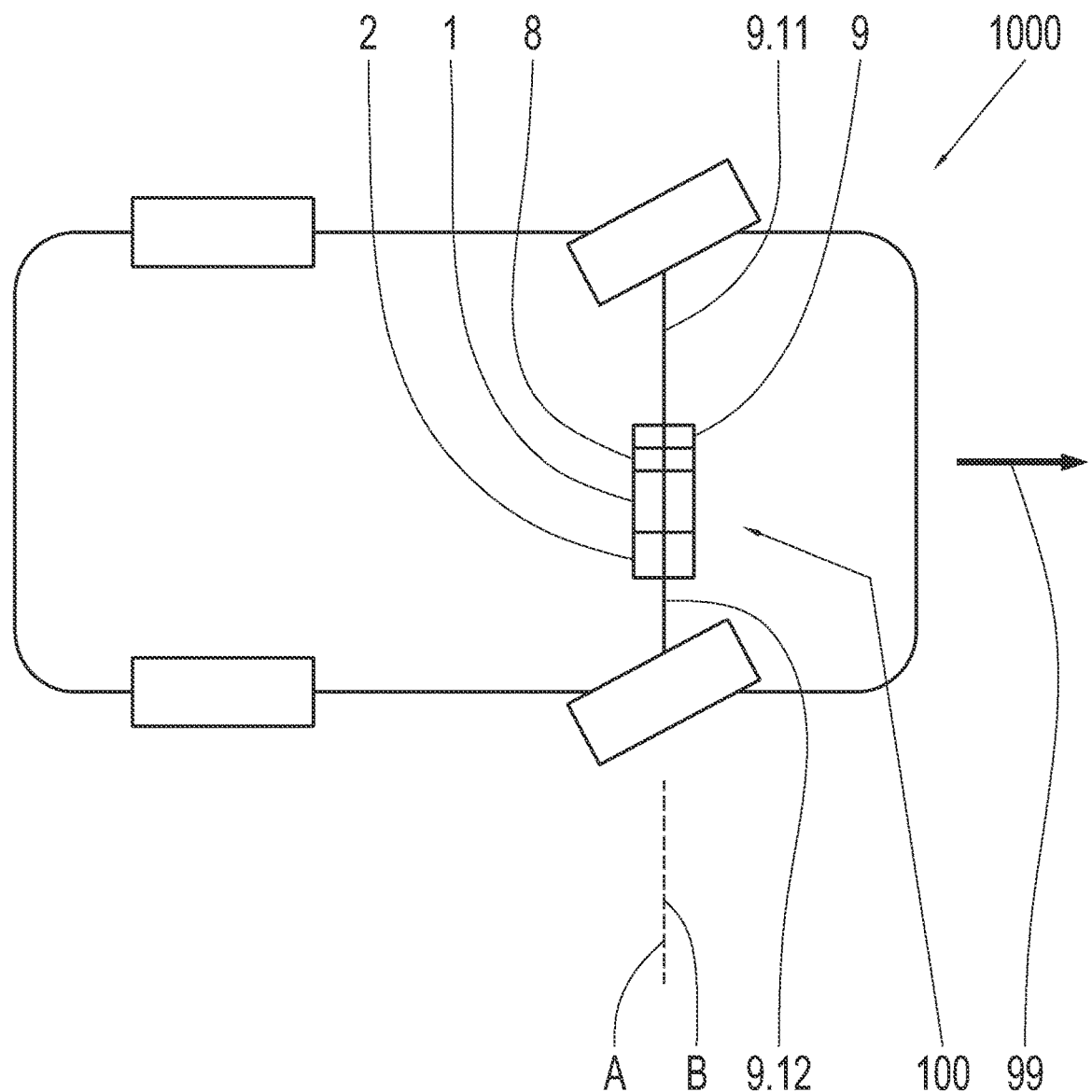
Figure 3:
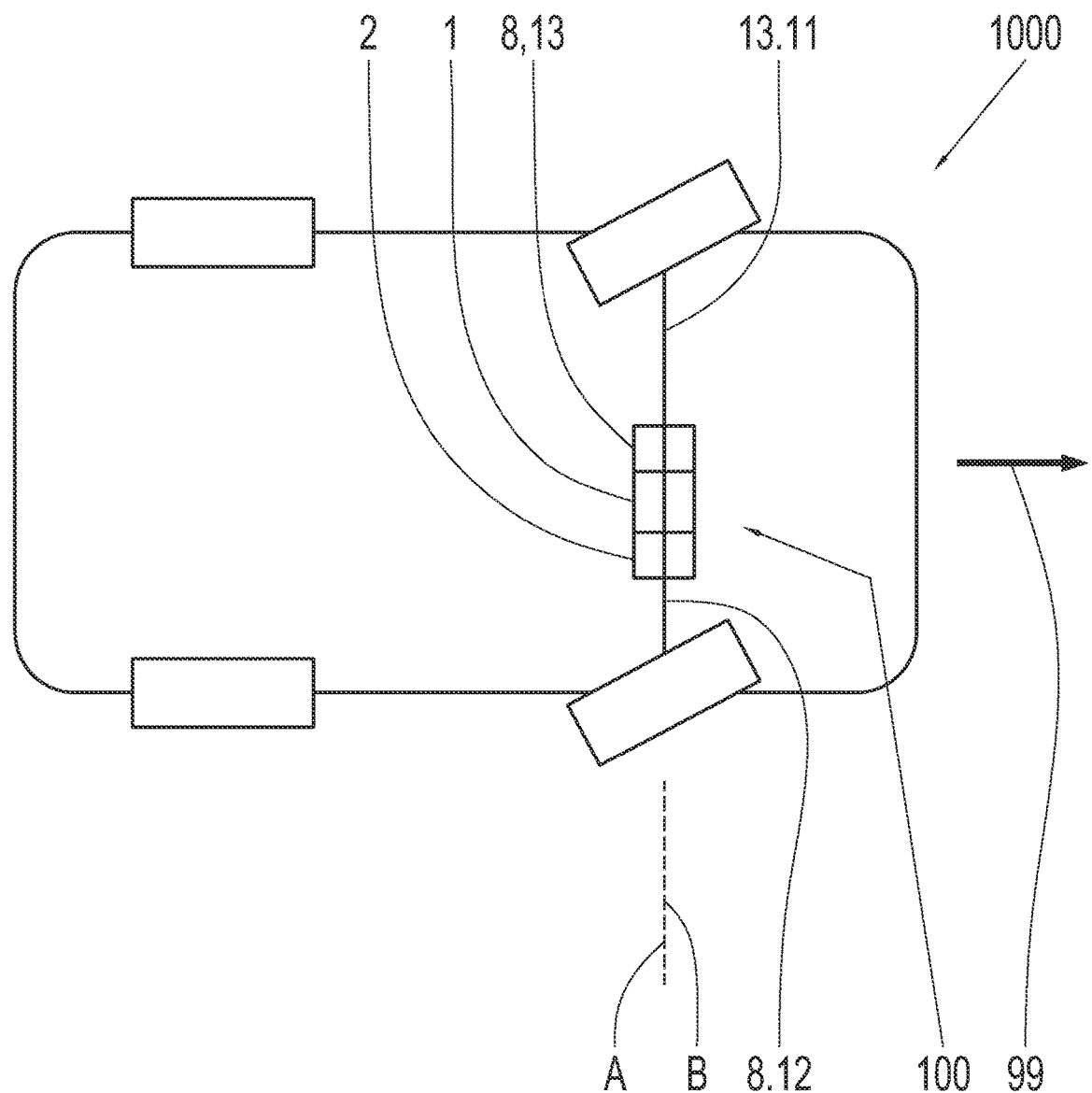

FIGS. 1 through 3 each show a diagrammatic view of a drive train 100 of a vehicle 1000. The vehicle is a passenger car.

The drive train 100 according to FIG. 1 shows an electric drive, which drives the front axle B of the vehicle 1000. The drive train includes a transmission 1, which splits the drive torque of the electric machine 2 onto two output shafts 9.11 and 9.12. The drive train 100 also includes a differential device, which includes a bevel gear differential 9 and a transmission gearing 14 in the form of a spur gear stage. The transmission 1 and the electric machine 2 are arranged coaxially to an axis A. The axis A and the axle B are arranged axially parallel, and so an axially parallel drive output is present. The forward direction of travel is represented by the arrow 99. As is also apparent in FIG. 1, the transmission 1 and the electric machine 2 are aligned transversely to the direction of travel 99 of the vehicle 1000.

The drive train 100 according to FIG. 2 shows an electric drive, which drives the front axle B of the vehicle 1000. The drive train includes a transmission 1, which splits the drive torque of the electric machine 2 onto two output shafts 9.11 and 9.12. The drive train 100 also includes a differential device, which includes a planetary transmission 8 and a bevel gear differential 9. The transmission 1 and the electric machine 2 are arranged coaxially to an axis A, which coincides with the drive axle B, and so a coaxial drive output is present. The forward direction of travel is represented by the arrow 99. As is also apparent in FIG. 2, the transmission 1 and the electric machine 2 are aligned transversely to the direction of travel 99 of the vehicle 1000.

The drive train 100 according to FIG. 3 shows an electric drive, which drives the front axle B of the vehicle 1000. The drive train includes a transmission 1, which splits the drive torque of the electric machine 2 onto two output shafts 13.11 and 8.12. The drive train 100 also includes a differential device, which has two planetary transmissions 8, 13. The transmission 1 and the electric machine 2 are arranged coaxially to an axis A, which coincides with the drive axle B, and so a coaxial drive output is present. The forward direction of travel is represented by the arrow 99. As is also apparent in FIG. 3, the transmission 1 and the electric machine 2 are aligned transversely to the direction of travel 99 of the vehicle 1000.

Figure 4:
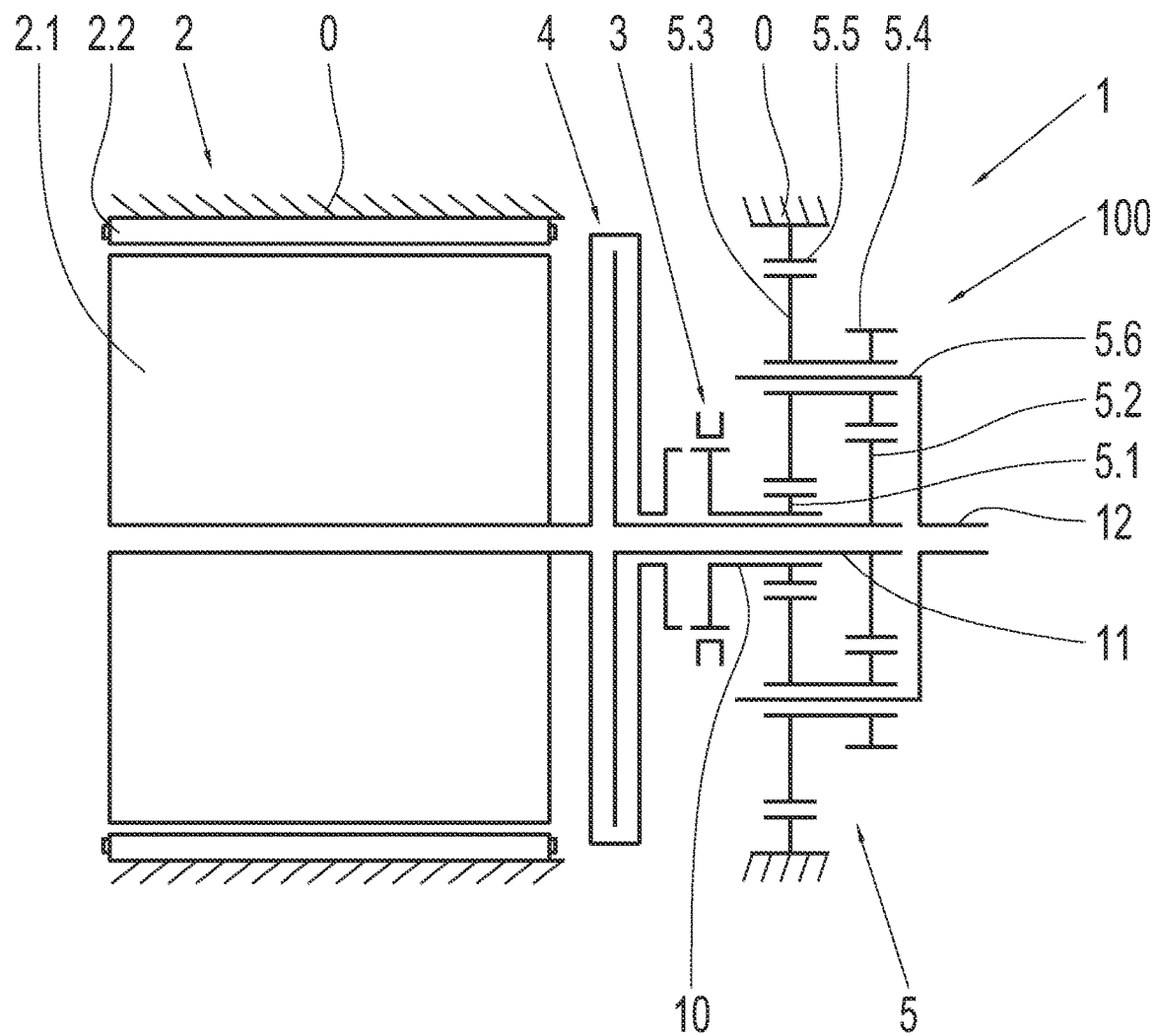
FIG. 4 shows a diagrammatic view of a transmission in a preferred example embodiment.

FIG. 4 shows an electric drive in a first example embodiment of the invention for a drive train 100 of a vehicle 1000. The electric drive includes a transmission 1 and an electric machine 2. The transmission 1 includes a first input shaft 10, a second input shaft 11, an output shaft 12, and two shift elements 3, 4 for connecting the transmission 1 to an electric machine 2 of the electric drive.

Moreover, the transmission 1 includes a planetary gear set 5. The planetary gear set 5 is designed as a stepped planetary gear set, the planetary gears 5.3, 5.4 of which, mounted at a planet carrier 5.6, have two different sized effective diameters. A first sun gear 5.1 of the planetary gear set 5 is in mesh with the larger effective diameter 5.3 of the planetary gears. A second sun gear 5.2 of the planetary gear set 5 is in mesh with the smaller effective diameter 5.4 of the planetary gears. A ring gear 5.5 of the planetary gear set 5 is in mesh with the larger effective diameter 5.3.

The first sun gear 5.1 of the planetary gear set 5 is rotationally fixed to the first input shaft 10. The second sun gear 5.2 of the planetary gear set 5 is rotationally fixed to the second input shaft 11. The ring gear 5.5 of the planetary gear set 5 is fixed at a rotationally fixed component 0 of the transmission 1. The planet carrier 5.6 of the planetary gear set 5 is rotationally fixed to the output shaft 12. A first shift element 3 is designed for connecting the first input shaft 10 to the electric machine of the electric drive. A second shift element 4 is designed for connecting the second input shaft 11 to the electric machine of the electric drive.

The first input shaft 10 is designed to be hollow and is arranged coaxially to the second input shaft 11. The second input shaft 11 is arranged within the first input shaft 10, which is designed to be hollow. The output shaft 12 is arranged coaxially to the first input shaft 10 and the second input shaft 11.

The first shift element 3 is arranged axially between the second shift element 4 and the first sun gear 5.1. The first shift element 3 is a dog clutch. If the first shift element 3 is actuated, the first input shaft 10 (and, therefore, the smaller sun gear 5.1 connected thereto) is connected to the electric machine 2, i.e., to the rotor 2.1. The second shift element 4 is a multi-disk clutch. If the second shift element 4 is actuated, the second input shaft 11 (and, therefore, the larger sun gear 5.2 connected thereto) is connected to the electric machine 2, i.e., to the rotor 2.1. The rotationally fixed component 0 is a transmission housing of the transmission 1.

The electric machine 2 includes, in a way known, per se, a rotor 2.1 and a stator 2.2 fixed at the transmission housing 0. An electric first gear E1 is formed by engaging the first shift element 3 and an electric second gear E2 is formed by engaging the second shift element 4. Since the second shift element is a friction-locking shift element, a traction powershift from the first gear into the second gear, and vice versa, is possible.

If both shift elements 3, 4 are engaged, the planetary gear set 5 and, thereby, the drive output 12 are interlocked against the housing 0. This represents the function of a parking lock, which can thereby be saved as a separate component/assembly in the drive.

FIG. 5 shows a gear shift matrix of the transmission from FIG. 4. Two forward gears E1 and E2 are represented in the rows of the matrix. In the columns of the gear shift matrix, an "X" represents which of the shift elements 3 and 4 are engaged in which gear. A first gear E1 is formed by engaging the first shift element 3 and a second gear E2 is formed by engaging the second shift element 4. The second shift element 4 is disengaged during the first gear E1. The first shift element 3 is disengaged during the second gear E2.

In the first gear E1 and the second gear E2, the ratio i is greater than one (1) in each case. In the first gear E1, the ratio i is four (i=4). In the second gear E2, the ratio i is two (i=2). The gear step between these two gears, therefore, is phi=2.0. The efficiency is designated as eta. It is 98.5% for the first gear E1. It is 99.0% for the second gear E2.

Figure 6:
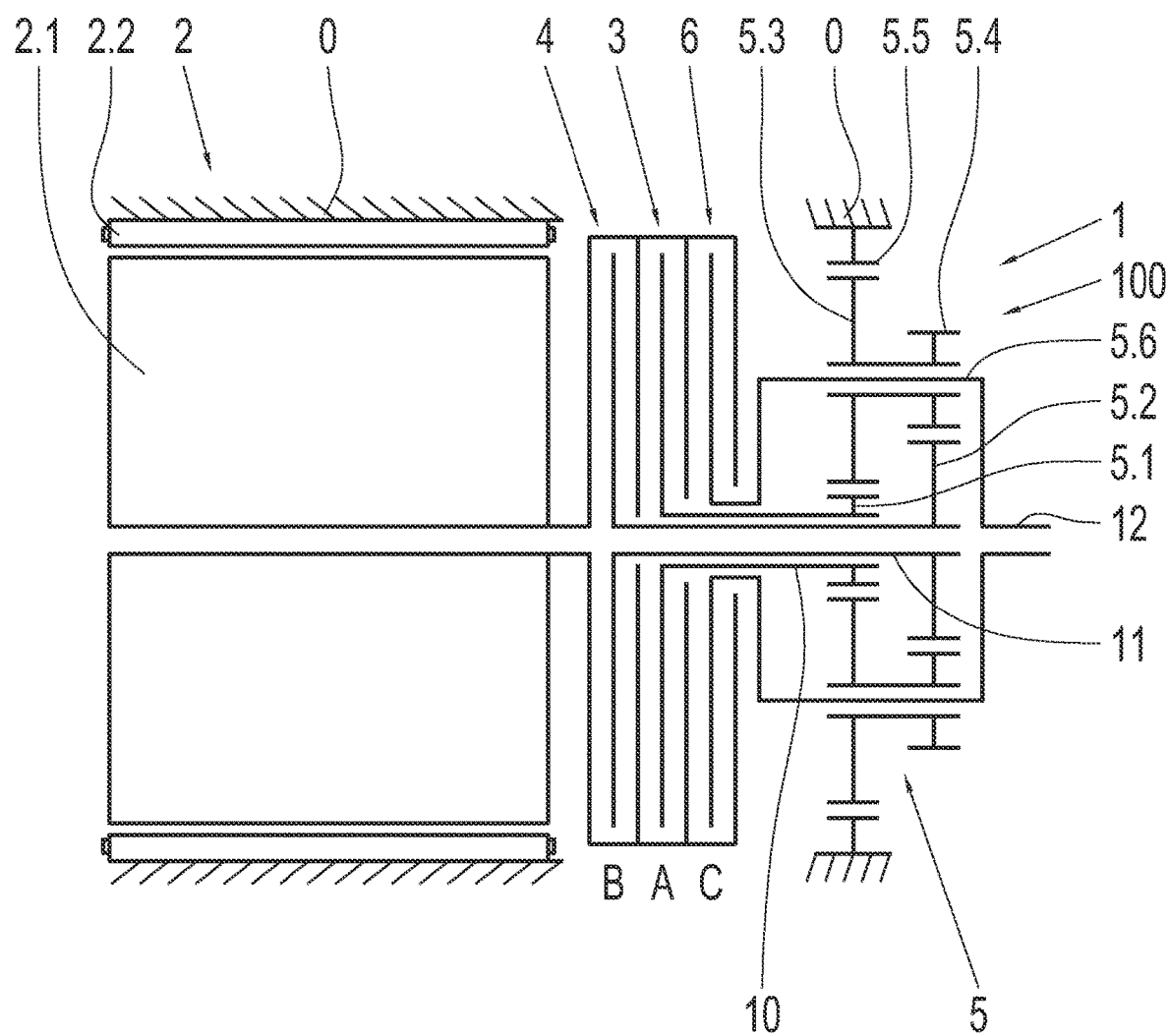
FIG. 6 shows a diagrammatic view of a transmission in a preferred example embodiment.

FIG. 6 shows an electric drive in a second example embodiment of the invention for a drive train 100 of a vehicle. In contrast to the example embodiment according to FIG. 4, a third shift element 6 is provided for connecting the output shaft 12 to the electric machine 2 of the electric drive, wherein the first shift element 3 is arranged axially between the second shift element 4 and the third shift element 6. This yields the following axial order: electric machine 2, second shift element 4, first shift element 3, third shift element 6, planetary gear set 5. If the third shift element 6 is actuated, the planet carrier 5.6 (and, thereby, the output shaft 12 connected thereto) is connected to the electric machine 2, i.e., to the rotor 2.1. A third gear E3 results by engaging the third shift element 6. This third gear E3 is a direct gear having a ratio i of one (i=1), and so a gear step i of essentially two (2.0) exists between the second gear E2 and the third gear E3. The three shift elements 3, 4, 6 are designed as friction-locking shift elements in the form of multi-disk clutches.

FIG. 9 shows a gear shift matrix of the transmission from FIG. 6. Three forward gears E1, E2, and E3 are represented in the rows of the matrix. In the columns of the gear shift matrix, an "X" represents which of the shift elements 3, 4, and 6 are engaged in which gear. A first gear E1 is formed by engaging the first shift element 3, a second gear E2 is formed by engaging the second shift element 4, and a third gear E3 is formed by engaging the third shift element 6.

The second shift element 4 and the third shift element 6 are disengaged during the first gear E1. The first shift element 3 and the third shift element 6 are disengaged during the second gear E2. The first shift element 3 and the second shift element 4 are disengaged during the third gear E3.

In the first gear E1 and the second gear E2, the ratio i is greater than one (1) in each case. In the third gear E3, the ratio i is equal to one (1). In the first gear E1, the ratio i is four (i=4). In the second gear E2, the ratio i is two (i=2). The gear step between these two gears, therefore, is phi=2.0. The efficiency is designated as eta. It is 98.5% for the first gear E1. It is 99.0% for the second gear E2. It is 100% for the third gear E3.

Figure 7:
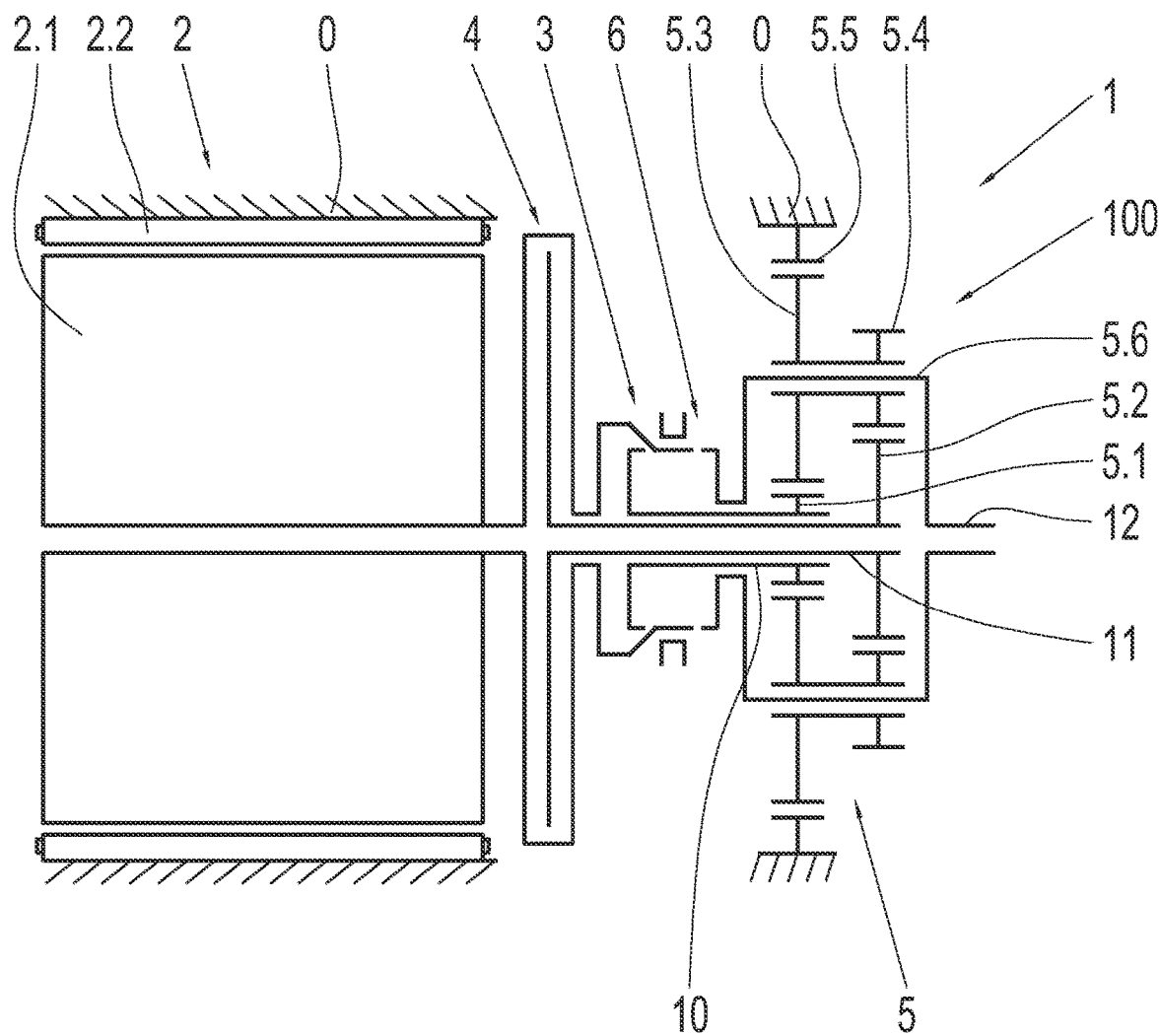
FIG. 7 shows a diagrammatic view of a transmission in a preferred example embodiment.

FIG. 7 shows an electric drive in a third example embodiment of the invention for a drive train 100 of a vehicle. This example embodiment differs from the example embodiment according to FIG. 6 in that the second shift element 4 is designed as a multi-disk clutch, while the first shift element 3 and the third shift element 6 are designed as form-locking shift elements in the form of constant-mesh shift elements. Instead of the dogs, cone clutches can also be utilized. Shift elements 3 and 6 are preferably designed as a double shift element, with which one actuating element is associated, wherein the first shift element, on the one hand, and the third shift element, on the other hand, are actuatable from a neutral position by the actuating element. The double shift element therefore has three shift positions.

According to this example embodiment, the gear change from E1 to E2 is power shiftable as a traction upshift and a traction downshift. The gear change E2 to E3 is not power shiftable as a traction upshift or as a traction downshift, which plays a secondary role in many drive train configurations, however, since these gear changes are above one hundred and forty kilometers per hour (140 km/h) and take place at low absolute output torques.

The shift elements 3 and 6 can also be represented as individual constant-mesh shift elements. The two shift elements 3, 6 can be simultaneously engaged in this case. As a result, the electric machine and, thereby, also the drive output (output shaft 12), are braked and/or interlocked against the housing 0 by the interlocked gear set 5. A parking lock function can be represented in this way. In addition, this example embodiment corresponds to the example embodiment according to FIG. 6, and so reference is made to these comments for the rest.

Figure 8:
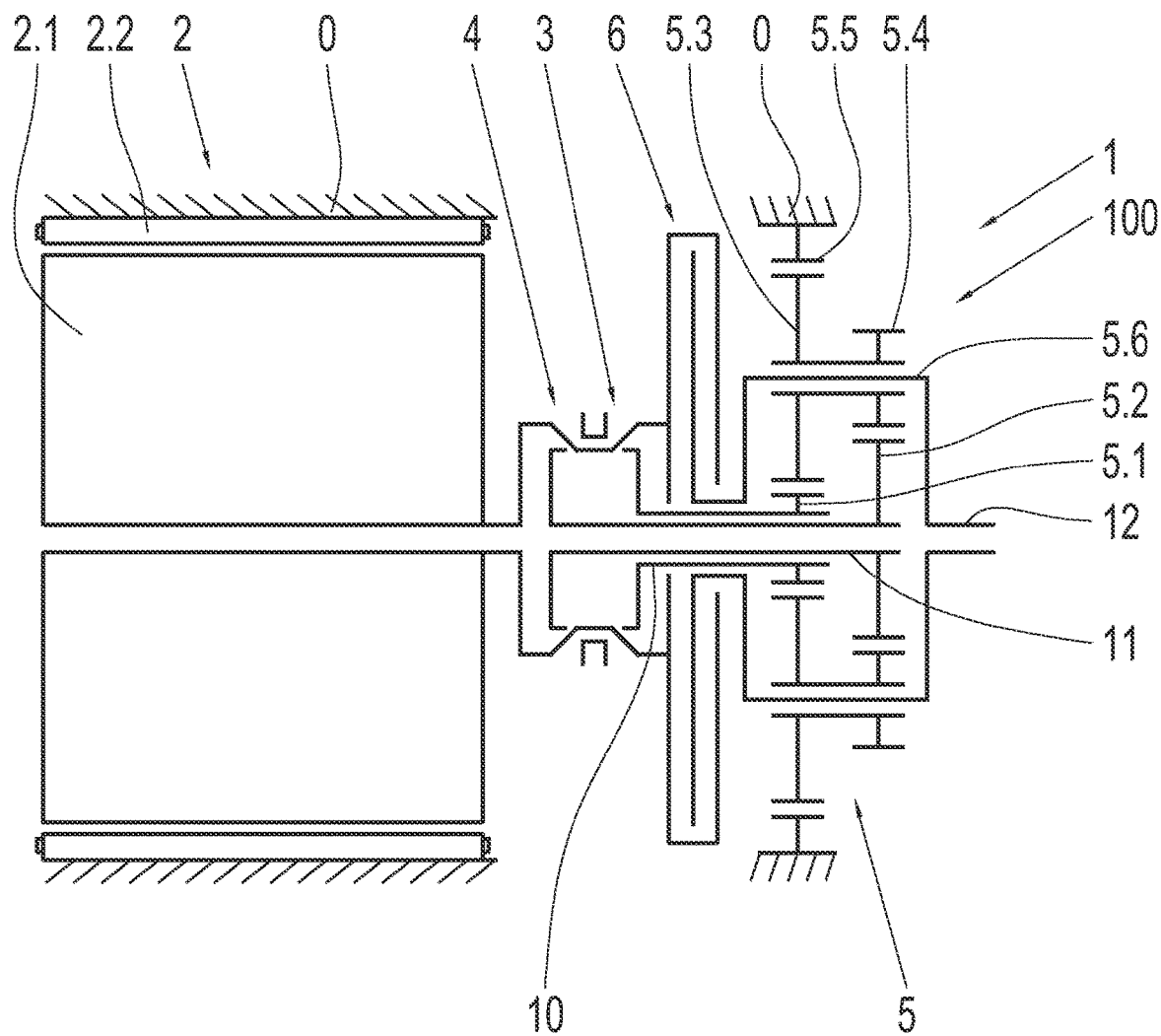
FIG. 8 shows a diagrammatic view of a transmission in a preferred example embodiment.

FIG. 8 shows an electric drive in a fourth example embodiment of the invention for a drive train 100 of a vehicle. This present transmission variant differs from the example embodiment according to FIG. 6 in that the shift element 6 is designed as a powershift element in the form of a multi-disk clutch and the shift elements 3 and 4 are designed as form-locking shift elements in the form of constant-mesh shift elements. Instead of the dogs, cone clutches can also be utilized. Shift elements 3 and 4 are preferably designed as a double shift element, with which one actuating element is associated, wherein the first shift element 3, on the one hand, and the second shift element 4, on the other hand, are actuatable from a neutral position by the actuating element. The double shift element therefore has three shift positions.

According to this example embodiment, the gear change from the second gear E2 to the third gear E3 is power shiftable as a traction upshift and as a traction downshift. The first gear E1 can be represented, in particular, as a performance gear, which is why a comfortable powershift from the first gear E1 to the second gear E2 may be dispensed with. The typical operation is implemented via the second gear E2 and the third gear E3 with traction powershifts (similarly to the two-speed example variant according to FIG. 4). In addition, this example embodiment corresponds to the example embodiment according to FIG. 6, and so reference is made to these comments for the rest.

Figure 10:
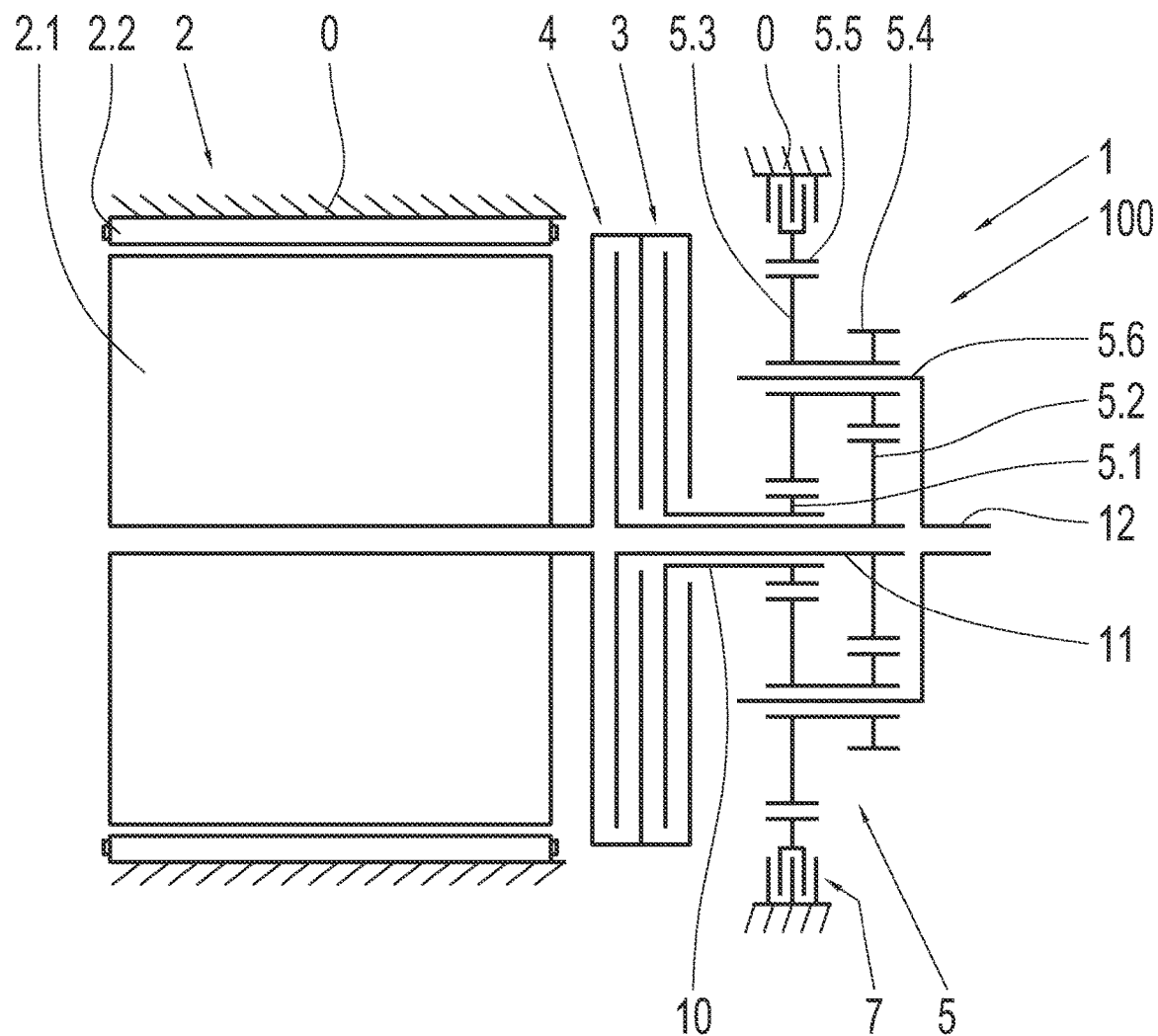
FIG. 10 shows a diagrammatic view of a transmission in a preferred example embodiment.

FIG. 10 shows an electric drive in a fifth example embodiment of the invention for a drive train 100 of a vehicle. This present transmission variant differs from the example embodiment according to FIG. 6 in that the ring gear 5.5 is not permanently fixed, but rather is fixable at the rotationally fixed component 0 by a fourth shift element 7. The third shift element 6 is dispensed with. A first gear E1 results by engaging the first shift element 3 and the fourth shift element 7. A second gear E2 results by engaging the second shift element 4 and the fourth shift element 7. A third gear E3 results by engaging the first shift element 3 and the second shift element 4.

The direct gear, which corresponds to the third gear, is now obtained by simultaneously engaging the shift elements 3 and 4 with the shift element 7 disengaged. The shift element 7 must be engaged in the first gear E1 and in the second gear E2. Therefore, two of the three shift elements are engaged in each of the three gears. This reduces the drag losses, and so this example embodiment is more efficient than the 3-speed example variant according to FIG. 6. The shift elements 3, 4, and 7, according to this example embodiment, are designed as powershift elements in the form of multi-disk clutches. This allows for a complete power shiftability between the gears E1 through E3. In addition, this example embodiment corresponds to the example embodiment according to FIG. 6, and so reference is made to these comments for the rest.

Figure 11:
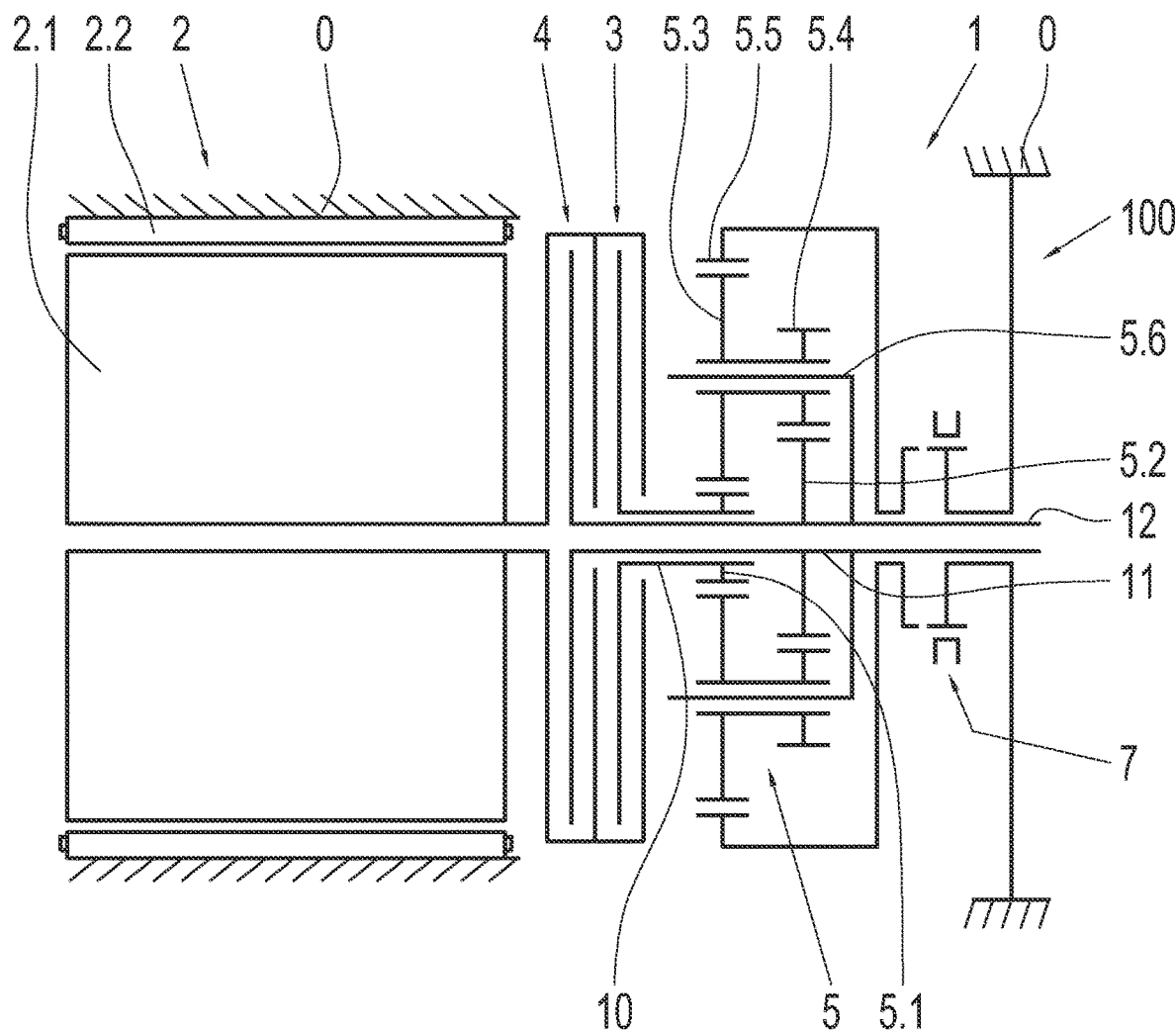
FIG. 11 shows a diagrammatic view of a transmission in a preferred example embodiment.

FIG. 11 shows an electric drive in a sixth example embodiment of the invention for a drive train 100 of a vehicle. This transmission variant differs from the example embodiment according to FIG. 10 in that the shift element 7 is designed as a dog clutch or a cone clutch. Therefore, the gear shift from the gear E1 into E2, and vice versa, is power shiftable in traction and overrun. The gear shift from the gear E2 into the gear E3, and vice versa, is power shiftable only in the traction operation, however. In the upper speed range with a low electrical tractive force, this is secondary with respect to comfort and performance, however. In the direct gear E3, negligible drag losses arise due to the disengaged constant-mesh shift element 7 in contrast to the disengaged powershift element 7 according to the example embodiment in FIG. 10. In addition, this example embodiment corresponds to the example embodiment according to FIG. 10, and so reference is made to these comments for the rest.

FIG. 12 shows a gear shift matrix of the transmission from FIGS. 10 and 11. Three forward gears E1, E2, and E3 are represented in the rows of the matrix. In the columns of the gear shift matrix, an "X" represents which of the shift elements 3, 4, and 7 are engaged in which gear. A first gear E1 is formed by engaging the first shift element 3 and the fourth shift element 7, a second gear E2 is formed by engaging the second shift element 4 and the fourth shift element 7, and a third gear E3 is formed by engaging the first shift element 3 and the second shift element 4. The second shift element 4 is disengaged during the first gear E1. The first shift element 3 is disengaged during the second gear E2. The fourth shift element 7 is disengaged during the third gear E3.

In the first gear E1 and the second gear E2, the ratio i is greater than one (1) in each case. In the third gear E3, the ratio i is equal to one (1). In the first gear E1, the ratio i is four (i=4). In the second gear E2, the ratio i is two (i=2). The gear step between these two gears, therefore, is phi=2.0. The efficiency is designated as eta. It is 98.5% for the first gear E1. It is 99.0% for the second gear E2. It is 100% for the third gear E3.

The following FIGS. 13 through 17 show a drive train including a transmission 1, an electric machine 2, and a differential device, which is connected to the output shaft 12 of the first planetary gear set 5. The connection of the electric drive to the differential device is described with reference to the transmission from FIG. 4. It is expressly pointed out that the transmissions from FIGS. 6 through 11 can also be connected to one of the differential devices described in the following and can be part of the drive train.

Figure 13:
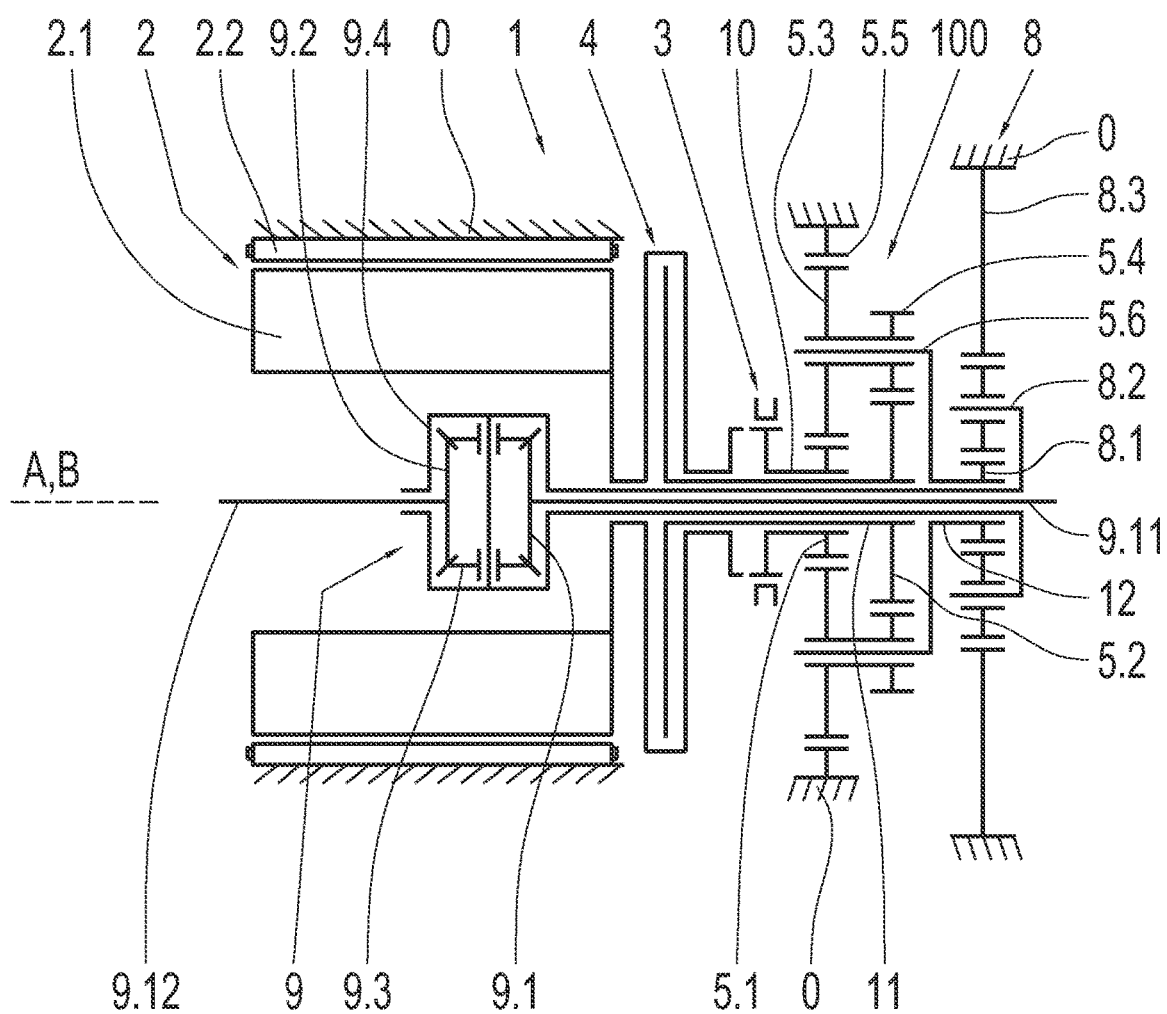
FIG. 13 shows a diagrammatic view of a drive train in a preferred example embodiment.

FIG. 13 shows an example preferred first drive train having the example embodiment according to FIG. 4 and a differential device, wherein the differential device includes a bevel gear differential 9 and a transmission gearing, wherein the transmission gearing is formed by a planetary gear set 8. The input axis A and the output axis B coincide. Therefore, a coaxial drive output exists.

The bevel gear differential 9 has two wheel-side output elements, which are designed as a first output gear 9.1 and a second output gear 9.2. The output gears 9.1, 9.2 each mesh with a differential element 9.3 designed as a spur gear. The differential elements 9.3 are mounted, rotatable about their own axes, in a differential cage 9.4. The first output gear 9.1 is rotationally fixed to a first output shaft 9.11 and the second output gear 9.2 is rotationally fixed to a second output shaft 9.12. The differential bevel gears 9.3, which operate between the cage 9.4 and the two output gears 9.1, 9.2, can transmit a turning motion from the cage 9.4 to the two output gears 9.1, 9.2 and provide a compensatory turning motion between the two output gears 9.1, 9.2.

The planetary gear sets 5 and 8 are arranged axially next to each other. The bevel gear differential 9 is arranged radially within the rotor 2.1 of the electric machine 2, and so the transmission and the drive train are axially particularly short. The minus planetary gear set 8 includes a ring gear 8.3 fixed at the transmission housing 0, a planet carrier 8.2, and a sun gear 8.1. The planet carrier 8.2 is rotationally fixed to the cage 9.4. The sun gear 8.1 is rotationally fixed to the output shaft 12. The shafts 10, 11, 12 are each designed as a hollow shaft. The planet carrier 8.2 is guided through the hollow shafts 10, 11, 12. The planet carrier 8.2 is also designed to be hollow. The first output shaft 9.11 is guided through the planet carrier 8.2. Due to the minus planetary gear set 8, a high overall gear ratio can be formed, in particular 6<i<13.5. The shift elements 3, 4 can also both be designed as constant-mesh shift elements. If both shift elements 3, 4 are present as dogs, the shift elements 3, 4 are preferably combined to form a double shift element.

Figure 14:
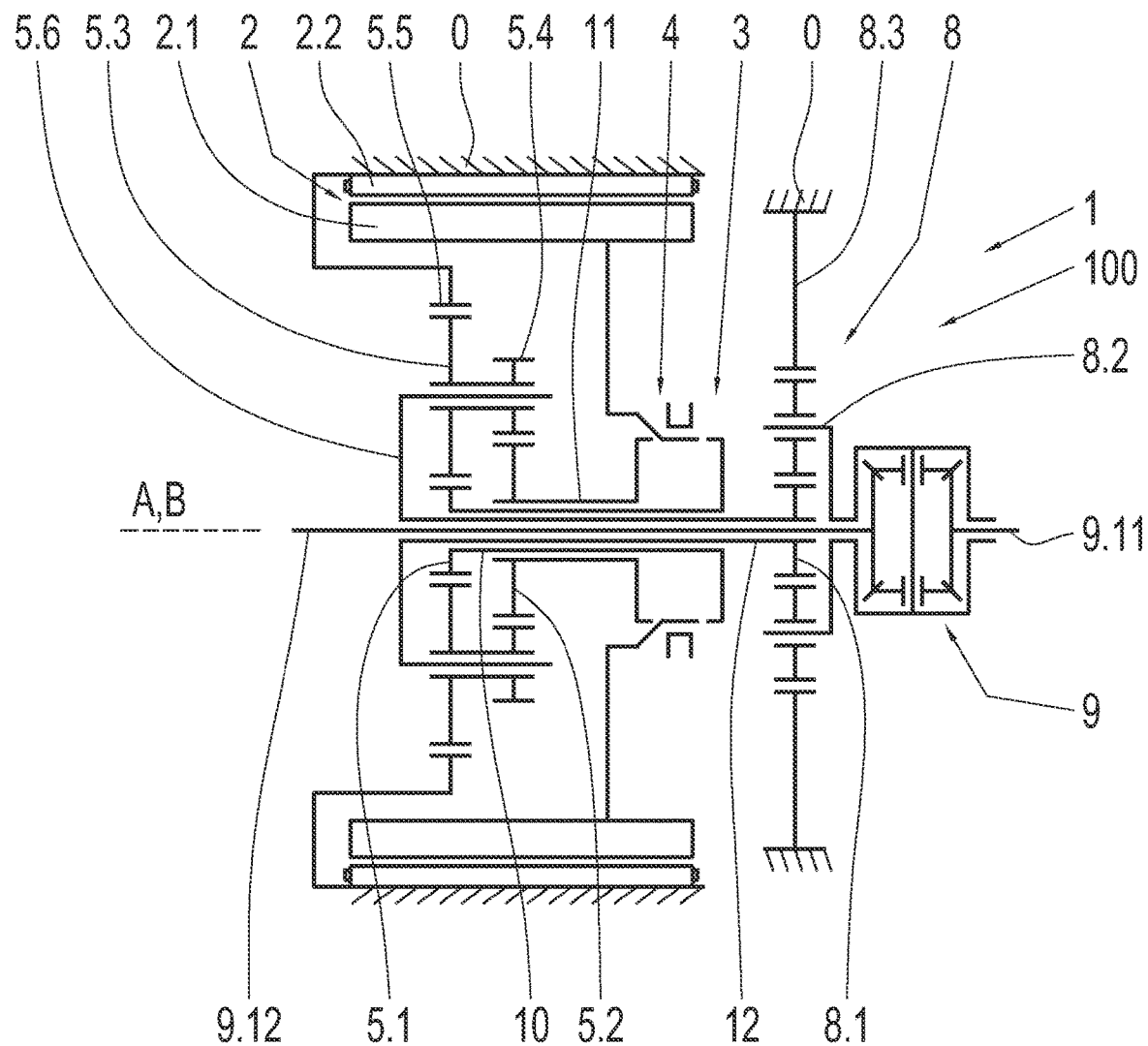
FIG. 14 shows a diagrammatic view of a drive train in a preferred example embodiment.

FIG. 14 shows an example preferred second drive train. This example embodiment differs from the example embodiment according to FIG. 13 in that, instead of the differential 9, the planetary gear set 5 is now arranged radially within the rotor 2.1. The input axis A and the output axis B coincide. Therefore, a coaxial drive output exists. The shafts 10, 11, 12 are each designed as a hollow shaft. The planet carrier 8.2 is guided through the hollow shafts 10, 11, 12. The planet carrier 8.2 is also designed to be hollow. The second output shaft 9.12 is guided through the planet carrier 8.2. One further difference is that both shift elements are designed as constant-mesh shift elements and, in addition, as a double shift element. This example embodiment is also axially short. A powershift is not possible in this case, however. For the rest, reference is made to the comments presented with respect to FIG. 13.

Figure 15:
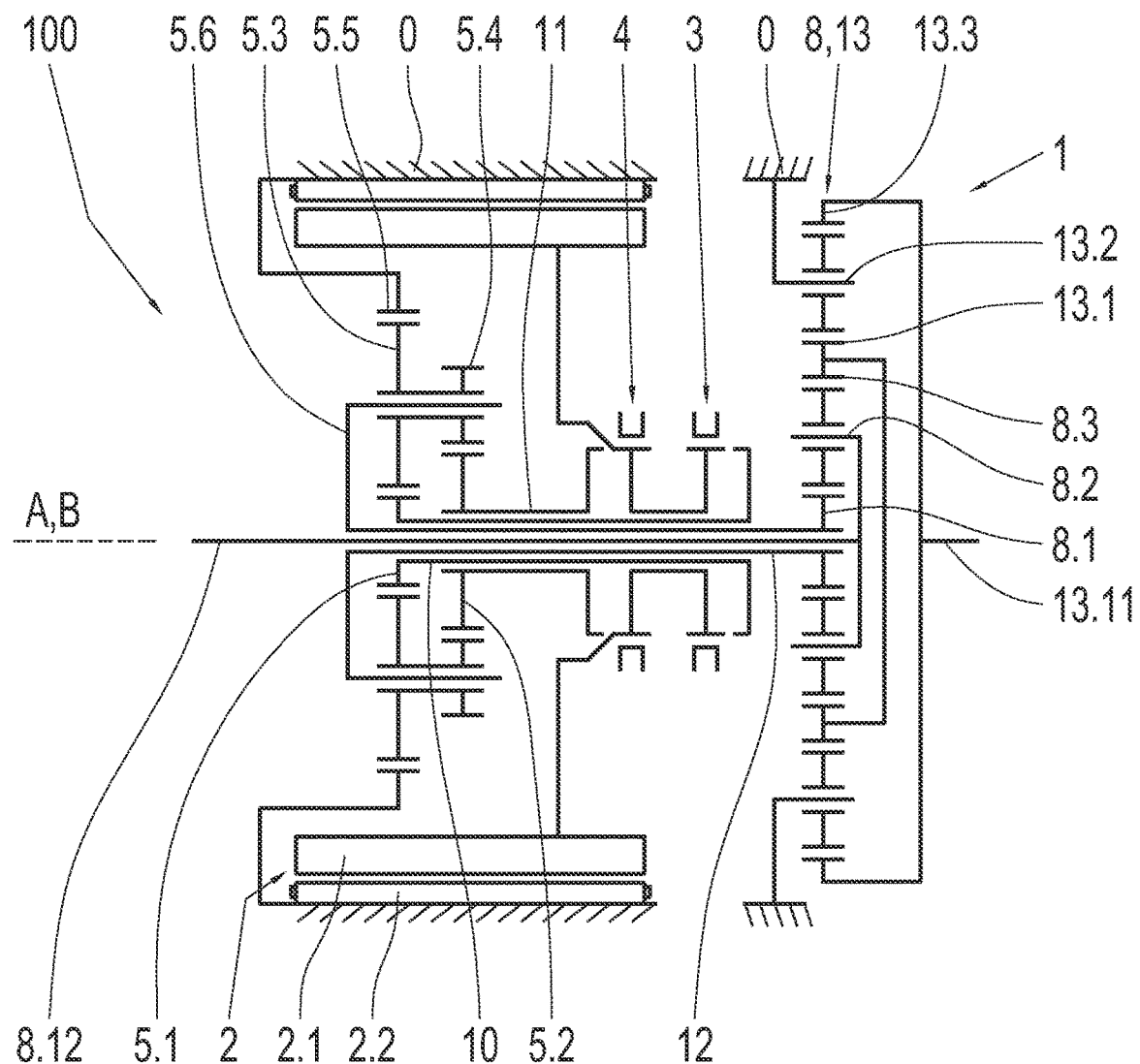
FIG. 15 shows a diagrammatic view of a drive train in a preferred example embodiment.

FIG. 15 shows an example preferred third drive train. This example embodiment differs from the example embodiment according to FIG. 14 in that the differential device is formed by a second planetary gear set 8 and a third planetary gear set 13. The input axis A and the output axis B coincide. Therefore, a coaxial drive output exists.

The planetary gear set 8 includes a sun gear 8.1, a planet carrier 8.2, and a ring gear 8.3. The planetary gear set 13 includes a sun gear 13.1, a planet carrier 13.2, and a ring gear 13.3. Planetary gear sets 8 and 13 are arranged radially one above the other, wherein the planetary gear set 8 is arranged radially within. The ring gear 8.3 is rotationally fixed to the sun gear 13.1. The ring gear 8.3 and the sun gear 13.1 are designed as one piece according to this example embodiment. The planet carrier 13.2 is fixed. The sun gear 8.1 is connected to the output shaft 12. The ring gear 13.1 is connected to a first output shaft 13.11. The planet carrier 8.2 is connected to a second output shaft 8.12. The shafts 10, 11, 12 are each designed as a hollow shaft. The second output shaft 8.12 is guided through the planet carrier 8.2 and connected at one axial end to the planet carrier 8.2.

In other words, an integrated differential, including planetary gear sets 8 and 13, is utilized in this example embodiment instead of the bevel gear differential 9 and the planetary gear set 8 from FIG. 14. The function of forming the overall gear ratio and the differential function are simultaneously represented by this differential gear set.

The shift elements 3 and 4 are each designed as a single constant-mesh shift element. The two shift elements 3, 4 can be simultaneously engaged, in order to brake and/or interlock the electric machine 2 and, thereby, also the output shaft 12 against the housing. In this way, a parking lock function can be represented.

Instead of two single shift elements, the shift elements 3, 4 can also be designed as a double shift element. It is also conceivable to design the shift elements 3 and 4 as friction-locking shift elements. In addition, it is conceivable to design the shift element 3 as a form-locking, in particular, dog or cone clutch, and to design the shift element 4 as a friction-locking shift element, in particular a multi-disk clutch.

Figure 16:
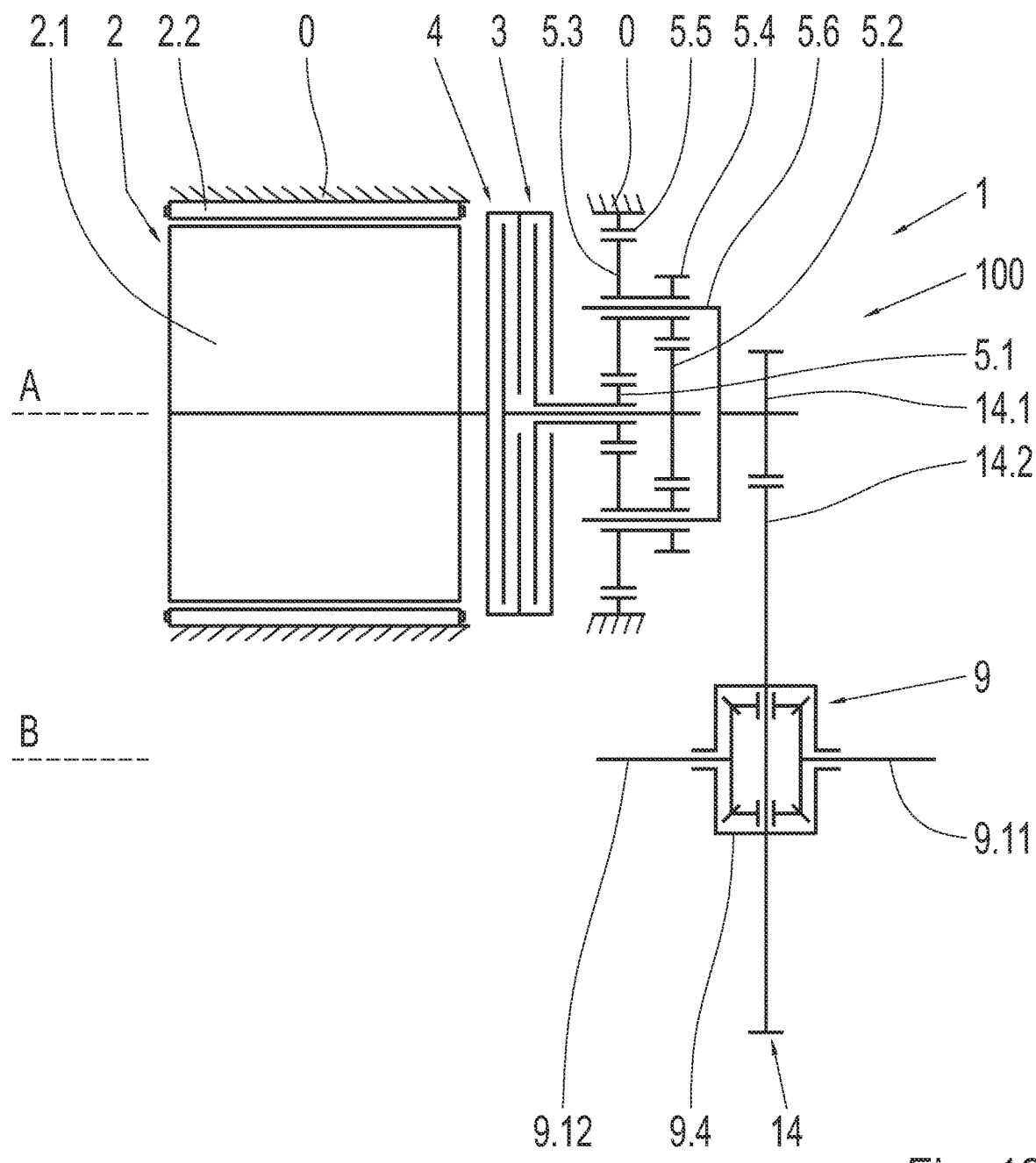
FIG. 16 shows a diagrammatic view of a drive train in a preferred example embodiment.

FIG. 16 shows an example preferred fourth drive train. This example embodiment differs from the example embodiment according to FIG. 13 in that the differential device includes a bevel gear differential 9 and a transmission gearing, wherein the transmission gearing is formed by a single-stage spur gear stage 14. The output axis B is arranged axially parallel to the input axis A. Therefore, an axially parallel drive output exists. The single-stage ratio of the spur gear stage brings about the overall gear ratio from the axis A of the input to the axis B of the drive output. The spur gear stage has two spur gears 14.1 and 14.2. The spur gear 14.1 is rotationally fixed to the output shaft 12 and is in mesh with the spur gear 14.2. The spur gear 14.2 is rotationally fixed to the cage 9.4 and can drive this. In addition, as an example variant, the first shift element 3 and the second shift element 4 are designed as friction-locking shift elements in the form of lamellar shift elements. According to this example embodiment, traction shifts and thrust shifts from the gear E1 to the gear E2, and vice versa, are power shiftable. The drive elements are arranged axially next to the electric motor 2. This allows for an electric motor 2 with a small outer diameter and, thereby, a small center distance between the input axis A and the output axis B. For the rest, reference is made to the comments presented with respect to FIG. 13. The transmission designs (transmission and shift elements) of the example drive trains according to FIGS. 12 through 15 can also be combined with the 1-stage, axially parallel arrangement.

Figure 17:
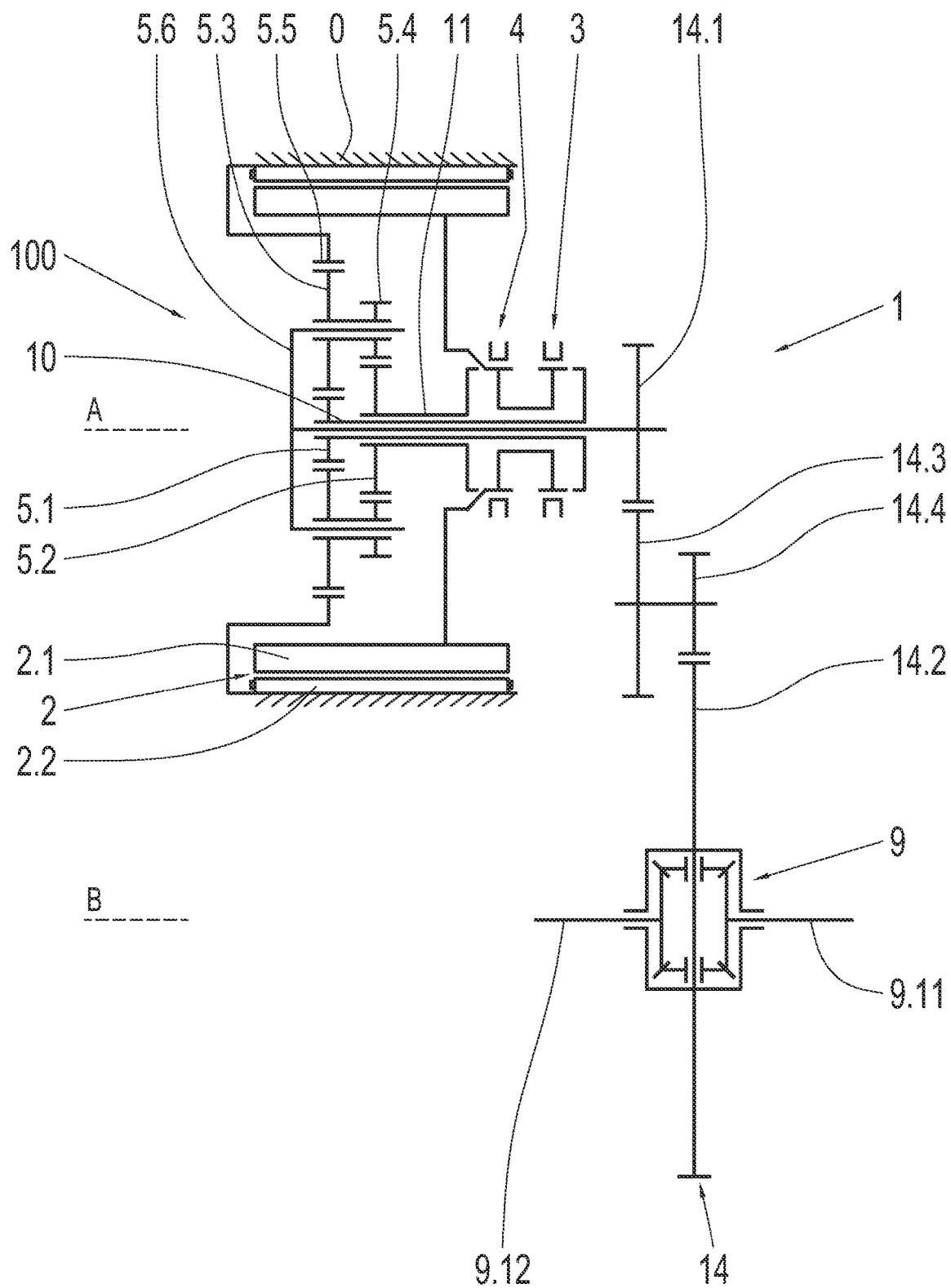
FIG. 17 shows a diagrammatic view of a drive train in a preferred example embodiment.

FIG. 17 shows an example preferred fifth drive train. This example embodiment differs from the example embodiment according to FIG. 16 in that the transmission gearing is formed by a two-stage spur gear stage 14. The output axis B is arranged axially parallel to the input axis A. Therefore, an axially parallel drive output exists. The two-stage ratio of the spur gear stage brings about the overall gear ratio from the axis A of the input to the axis B of the output. The spur gear stage has four spur gears 14.1, 14.2, 14.3, and 14.4. The spur gear 14.1 is rotationally fixed to the output shaft 12. The spur gear 14.2 is rotationally fixed to the cage 9.4 of the differential 9 and can drive the cage 9.4. Two spur gears 14.3 and 14.4, which are connected to each other in a rotationally fixed manner, are arranged, as a further stage, between the spur gears 14.1 and 14.2. The spur gear 14.3 is in mesh with the spur gear 14.4 is in mesh with the spur gear 14.2. In addition, the first shift element 3 and the second shift element 4 are designed as friction-locking shift elements in the form of lamellar shift elements. For the rest, reference is made to the comments presented with respect to FIG. 16. The example transmission designs (transmission and shift elements) of the drive trains according to FIGS. 12 through 15 can also be combined with the 1-stage, axially parallel arrangement.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

LIST OF REFERENCE CHARACTERS 1 transmission
2 electric machine
2.1 rotor
2.2 stator
3 shift element
4 shift element
5 planetary gear set
5.1 sun gear
5.2 sun gear
5.3 planet gear
5.4 planet gear
5.5 ring gear
5.6 planet carrier
6 shift element
7 shift element
8 planetary gear set
9 bevel gear differential
9.1 output gear
9.2 output gear
9.3 compensating element(s)
9.4 differential cage, cage
9.11 first output shaft
9.12 second output shaft
10 input shaft
11 input shaft
12 output shaft, drive output
13 planetary gear set
13.1 sun gear
13.2 planet carrier
13.3 ring gear
14 spur gear stage, single-stage, two-stage
14.1 spur gear
14.2 spur gear
14.3 spur gear
14.4 spur gear
99 direction of travel
100 drive train
1000 vehicle, passenger car
A input axis
B output axis
E1 first gear
E2 second gear
i ratio
phi gear step
eta efficiency

The invention claimed is:

1. An electric drive for a vehicle, comprising:
an electric machine (2);
a transmission (1) comprising a first input shaft (10), a second input shaft (11), an output shaft (12), at least two shift elements (3, 4, 6, 7) for selectively connecting the transmission (1) to the electric machine (2), and a planetary gear set (5) configured as a stepped planetary gear set with planetary gears (5.3, 5.4) mounted at a planet carrier (5.6), the planetary gears (5.3, 5.4) having two different sized effective diameters,
wherein a first sun gear (5.1) of the planetary gear set (5) is meshed with a larger effective diameter (5.3) of the planetary gears,
wherein a second sun gear (5.2) of the planetary gear set (5) is meshed with a smaller effective diameter (5.4) of the planetary gears,
wherein a ring gear (5.5) of the planetary gear set (5) is meshed with the larger effective diameter (5.3) of the planetary gears, wherein the first sun gear (5.1) of the planetary gear set (5) is rotationally fixed to the first input shaft (10), wherein the second sun gear (5.2) of the planetary gear set (5) is rotationally fixed to the second input shaft (11), wherein the ring gear (5.5) of the planetary gear set (5) is fixed at a rotationally fixed component (0) of the transmission (1), wherein the planet carrier (5.6) of the planetary gear set (5) is rotationally fixed to the output shaft (12), wherein a first shift element (3) of the at least two shift elements (3, 4, 6, 7) is configured for selectively connecting the first input shaft (10) to the electric machine of the electric drive, and wherein a second shift element (4) of the at least two shift elements (3, 4, 6, 7) is configured for selectively connecting the second input shaft (11) to the electric machine (2) of the electric drive.

2. The transmission of claim 1, wherein the first input shaft (10) is arranged coaxially to the second input shaft (11).

3. The transmission of claim 2, wherein the first input shaft (10) is configured as a hollow shaft, and the second input shaft (11) is arranged within the first input shaft (10).

4. The transmission of claim 1, wherein the output shaft (12) is arranged coaxially to the first input shaft (10) and the second input shaft (11).

5. The transmission of claim 1, wherein the first shift element (3) is arranged axially between the second shift element (4) and the first sun gear (5.1).

6. The transmission of claim 1, wherein a first gear ratio (E1) results by engaging the first shift element (3), and a second gear ratio (E2) results by engaging the second shift element (4).

7. The transmission of claim 1, wherein the planetary gear set is interlocked by engaging the first shift element and the second shift element.

8. The transmission of claim 1, wherein a gear step (i) of essentially two exists between a first gear ratio (E1) and a second gear ratio (E2).

9. The transmission of claim 1, further comprising a third shift element (6) configured for selectively connecting the output shaft (12) to the electric machine of the electric drive.

10. The transmission of claim 9, wherein a third gear ratio (E3) results by engaging the third shift element (6).

11. The transmission of claim 10, wherein a gear step (i) of essentially two exists between a second gear ratio (E2) and a third gear ratio (E3).

12. The transmission of claim 1, wherein at least one of the at least two shift elements (3, 4, 5, 7) is a multi-disk clutch or a cone clutch.

13. The transmission of claim 1, wherein at least one of the at least two shift elements (3, 4, 6, 7) is a dog clutch.

14. An electric drive for a vehicle, comprising:
an electric machine (2);
a transmission (1) comprising a first input shaft (10), a second input shaft (11), an output shaft (12), at least two shift elements (3, 4, 6, 7) for selectively connecting the transmission (1) to the electric machine (2), and a planetary gear set (5) configured as a stepped planetary gear set with planetary gears (5.3, 5.4) mounted at a planet carrier (5.6), the planetary gears (5.3, 5.4) having two different sized effective diameters, wherein a first sun gear (5.1) of the planetary gear set (5) is meshed with a larger effective diameter (5.3) of the planetary gears, wherein a second sun gear (5.2) of the planetary gear set (5) is meshed with a smaller effective diameter (5.4) of the planetary gears, wherein a ring gear (5.5) of the planetary gear set (5) is meshed with the larger effective diameter (5.3) of the planetary gears, wherein the first sun gear (5.1) of the planetary gear set (5) is rotationally fixed to the first input shaft (10), wherein the second sun gear (5.2) of the planetary gear set (5) is rotationally fixed to the second input shaft (11), wherein the planet carrier (5.6) of the planetary gear set (5) is rotationally fixed to the output shaft (12), wherein a first shift element (3) of the at least two shift elements (3, 4, 6, 7) is configured for selectively connecting the first input shaft (10) to the electric machine of the electric drive, and wherein a second shift element (4) of the at least two shift elements (3, 4, 6, 7) is configured for selectively connecting the second input shaft (11) to the electric machine (2) of the electric drive, and the ring gear (5.5) of the planetary gear set (5) is selectively fixable at a rotationally fixed component (0) of the transmission (1) by a fourth shift element (7) of the at least two shift elements (3, 4, 6, 7).

15. The transmission of claim 14, wherein one or more of:
a first gear ratio (E1) results by engaging the first shift element (3) and the fourth shift element (7);
a second gear ratio (E2) results by engaging the second shift element (4) and the fourth shift element (7); and
a third gear ratio (E3) results by engaging the first shift element (3) and the second shift element (4).

16. An electric drive for a vehicle, comprising:
an electric machine (2); and
a transmission (1) comprising a first input shaft (10), a second input shaft (11), an output shaft (12), at least two shift elements (3, 4, 6, 7) for selectively connecting the transmission (1) to the electric machine (2), and a first planetary gear set (5) configured as a stepped planetary gear set with planetary gears (5.3, 5.4) mounted at a planet carrier (5.6), the planetary gears (5.3, 5.4) having two different sized effective diameters, wherein a first sun gear (5.1) of the first planetary gear set (5) is meshed with a larger effective diameter (5.3) of the planetary gears, wherein a second sun gear (5.2) of the first planetary gear set (5) is meshed with a smaller effective diameter (5.4) of the planetary gears, wherein a ring gear (5.5) of the first planetary gear set (5) is meshed with the larger effective diameter (5.3) of the planetary gears, wherein the first sun gear (5.1) of the first planetary gear set (5) is rotationally fixed to the first input shaft (10), wherein the second sun gear (5.2) of the first planetary gear set (5) is rotationally fixed to the second input shaft (11), wherein the ring gear (5.5) of the first planetary gear set (5) is fixed at a rotationally fixed component (0) of the transmission (1), wherein the planet carrier (5.6) of the first planetary gear set (5) is rotationally fixed to the output shaft (12), wherein a first shift element (3) of the at least two shift elements (3, 4, 6, 7) is configured for selectively connecting the first input shaft (10) to the electric machine of the electric drive, wherein a second shift element (4) of the at least two shift elements (3, 4, 6, 7) is configured for selectively connecting the second input shaft (11) to the electric machine (2) of the electric drive, and
wherein the electric machine (2) is connectable to the transmission (1) via the at least two shift elements (3, 4, 6, 7) in order to form gear steps.

17. A drive train (100) for a vehicle, comprising:
the electric drive of claim 16; and
a differential connected to the output shaft (12) of the first planetary gear set (5).

18. The drive train of claim 17, wherein the differential comprises a bevel gear differential (9) and a transmission gearing, and the transmission gearing is formed by a spur gear stage (14) or by a second planetary gear set (8).

19. The drive train of claim 17, wherein the differential comprises a second planetary gear set (8) and a third planetary gear set (13).

20. The drive train of claim 17, wherein the differential comprises a bevel gear differential (9) and a transmission gearing, and the transmission gearing is formed by a second planetary gear set (8) and the bevel gear differential is arranged radially within a rotor (2.1) of the electric machine (2).

* * * * *